(12) United States Patent
Lin et al.

(10) Patent No.: US 6,535,408 B2
(45) Date of Patent: Mar. 18, 2003

(54) POWER CONVERTER WITH ADJUSTABLE OUTPUT VOLTAGE

(75) Inventors: Hsing-Liang Lin, Lu-Ju Shiang (TW); Ko- Yu Hsiao, Chuang-Li (TW)

(73) Assignee: Delta Electronics, Inc., Taoyuan Hsien (TW)

( * ) Notice: Subject to any disclaimer, the term of this patent is extended or adjusted under 35 U.S.C. 154(b) by 0 days.

(21) Appl. No.: 09/947,207

(22) Filed: Sep. 4, 2001

(65) Prior Publication Data

US 2002/0075710 A1 Jun. 20, 2002

(30) Foreign Application Priority Data

Dec. 20, 2000  (TW) ........................................ 89127333 A

(51) Int. Cl.[7] ............................ H02M 7/217; G05F 1/44
(52) U.S. Cl. ........................ 363/127; 323/282; 327/393
(58) Field of Search ............................ 363/127, 89, 74, 363/84; 323/266, 282, 284, 285, 288; 327/280, 282, 263, 287, 393

(56) References Cited

U.S. PATENT DOCUMENTS 4,914,440 A * 4/1990 Ramet .......................... 341/140
5,841,313 A * 11/1998 Levin et al. .................. 327/393

\* cited by examiner

Primary Examiner—Rajnikant B. Patel
(74) Attorney, Agent, or Firm—J.C. Patents

(57) ABSTRACT

An adjustable output voltage power converter. The power converter has a positive voltage output terminal, a negative voltage output terminal, a voltage comparator, a voltage shift resistor and a current source. The voltage comparator has a first input terminal, a second input terminal and a compare output terminal. The second input terminal picks up a reference voltage. The compare output terminal is electrically connected to one terminal of a Zf. The first input terminal is electrically connected to a second terminal of the Zf and one terminal of a Zi. The other terminal of the Zi is electrically connected to the current source and one terminal of the voltage shift resistor. The other terminal of the voltage shift resistor is electrically connected to the positive voltage output terminal.

15 Claims, 4 Drawing Sheets

POWER CONVERTER WITH ADJUSTABLE OUTPUT VOLTAGE

CROSS-REFERENCE TO RELATED APPLICATION

This application claims the priority benefit of Taiwan application serial no. 89127333, filed Dec. 20, 2000.

BACKGROUND OF THE INVENTION

1. Field of Invention

The present invention relates to a power converter. More particularly, the present invention relates to a power converter with adjustable output voltage.

2. Description of Related Art

With the refinement of semiconductor fabrication technologies, the operating voltage of most semiconductor devices has dropped considerably. In the past, a constant voltage such as 12V, 5V or 3.3V was applied to most semiconductor devices. At present, the operating voltage of most semiconductor devices is smaller than 3.3V. In addition, the operating voltage no longer has to be fixed at a definite value. For example, to obtain a higher operating efficiency, a central processing unit (CPU) communicating with a chipset, memory units or other devices can adjust the operating voltage automatically. In other words, the power supply must be able to provide an output voltage that can be adjusted automatically.

In the design of most power converters, a monolithic integrated circuit (monolithic IC) is often used to perform pulse width modulation (PWM). FIG. 1 is a diagram showing a conventional power converter 10 and a portion of its internal electric circuit. To control pulse width, a voltage comparator 110 is used inside a pulse width modulation IC (PWM IC). The voltage comparator 110 compares the output voltage $+V_0$ of the power converter 10 with a reference voltage $V_{ref}$. To program the output voltage of the power converter 10, the semiconductor manufacturer incorporates a digital-to-analog (D/A) converter 120 inside the PWM IC 100. According to the input digital signals such as VID0, VID1, VID2 . . . VIDn, the digital/analog converter 120 determines the output reference voltage $V_{ref}$. The digital signals VID0, VID1, VID2 . . . VIDn are called the voltage identification codes.

By setting the bit values of the voltage identification codes VID0, VID1, VID2 . . . VIDn, quantity of the output voltage can be varied. Using a 5bit voltage identification code as an example, all the voltage identification codes VID0~VID4 having a bit value '1' may imply an output voltage of 0V. On the other hand, all the voltage identification codes VID0~VID4 having a bit value '0' may imply an output voltage of 1.85V. A change in any one bit value may represent an ultimate difference in the output voltage of about 0.025V. Hence, by setting the voltage identification codes VID0~VID4, the output voltage provided by the power converter may be changed accordingly. The process of finding the relationship between a bit arrangement of the voltage identification codes and corresponding output voltage is often referred to as a bit mapping.

Since semiconductor fabrication involves a large number of processes, each device may be affected by many variables. Hence, for different semiconductor devices, different operating voltages are required. To provide different operating voltages, a power converter having different voltage identification codes in the PWM IC must be used. However, designing the voltage identification codes in a PWM IC often take more than a year. In a rapidly changing semiconductor marketplace, such a slow turnover rate is unacceptable.

SUMMARY OF THE INVENTION

Accordingly, one object of the present invention is to provide an adjustable output voltage power converter that permits fine tuning of the voltage produced by a pulse width modulation integrated circuit with any kind of voltage identification codes, so that the same type of power converter can be used to provide a range of operating voltages.

To achieve these and other advantages and in accordance with the purpose of the invention, as embodied and broadly described herein, the invention provides an adjustable output voltage power converter. The power converter includes a voltage comparator, a voltage shift resistor and a current source. The voltage comparator has two input terminals and a compare output. The compare output of the voltage comparator is electrically coupled to one end of a Zf One of the input terminals of the voltage comparator is electrically coupled to the other terminal of the Zf and one end of a Zi. The other end of the Zi is electrically connected to the current source and the other terminal of the voltage shift resistor. The other terminal of the voltage shift resistor is electrically coupled to a positive voltage output terminal. In addition, the other input terminal of the voltage comparator receives a reference voltage to serve as a reference for voltage comparison.

The reference voltage can be provided by a digital-to-analog converter. The digital-to-analog converter receives a voltage identification code that includes a set of inputs and produces a reference voltage that corresponds to the voltage identification code.

In this invention, the voltage-regulating circuit that includes the current source and the voltage shift resistor can be electrically coupled to the negative voltage output terminal of the power converter. By adjusting voltage at the negative voltage output terminal, output voltage of the power converter can be adjusted.

In another aspect of this invention, the positive voltage output terminal and the negative voltage output terminal are electrically coupled via the current source. Furthermore, a voltage shift resistor is coupled to the circuit path between the current source and the positive voltage output terminal. Similarly, another voltage shift resistor is coupled to the circuit path between the current source and the negative voltage output terminal. With such an arrangement, the current source is able to adjust voltage at both the positive and the negative voltage output terminal concurrently so that a small current can be used to obtain identical voltage variation.

This invention also provides an alternative type of adjustable output voltage power converter. The power converter includes a positive voltage output terminal, a negative voltage output terminal and a pulse width modulation integrated circuit (PWM IC). According to a voltage identification code, the PWM IC outputs a corresponding adjustable voltage to the positive voltage output terminal via a Zi. The power converter further includes a voltage shift resistor and a current source. In one of the embodiments of this invention, one of the terminals of the voltage shift resistor is electrically coupled to the Zi while the other terminal of the voltage shift resistor is electrically coupled to the positive voltage output terminal. One terminal of the current source is electrically coupled to the circuit path between the voltage shift resistor and the Zi.

According to a second embodiment of this invention, one terminal of the voltage shift resistor is electrically coupled to the negative output terminal while the other terminal of the voltage shift resistor is electrically coupled to the negative voltage output terminal. One terminal of the current source is electrically coupled to the circuit path between the voltage shift resistor and the negative output terminal.

According to a third embodiment of this invention, altogether two voltage shift resistors and a current source are used. One terminal of the first voltage shift resistor is electrically coupled to the Zi while the other terminal of the first voltage shift resistor is electrically coupled to the positive voltage output terminal. One terminal of the second voltage shift resistor is electrically coupled to the negative output terminal while the other terminal of the second voltage shift resistor is electrically coupled to negative voltage output terminal. One terminal of the current source is electrically coupled to a circuit path between the Zi and the first voltage shift resistor. Similarly, the other terminal of the current source is electrically coupled to a circuit path between the negative output terminal and the second voltage shift resistor.

In brief, the voltage-adjustable circuit constructed using a current source and a voltage shift resistor is set up to modify the voltage range of a power converter. Hence, there is no need to design a PWM integrated circuit anew for a different voltage identification code.

It is to be understood that both the foregoing general description and the following detailed description are exemplary, and are intended to provide further explanation of the invention as claimed.

DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention. In the drawings.

DESCRIPTION OF THE PREFERRED EMBODIMENTS

Figure 1:
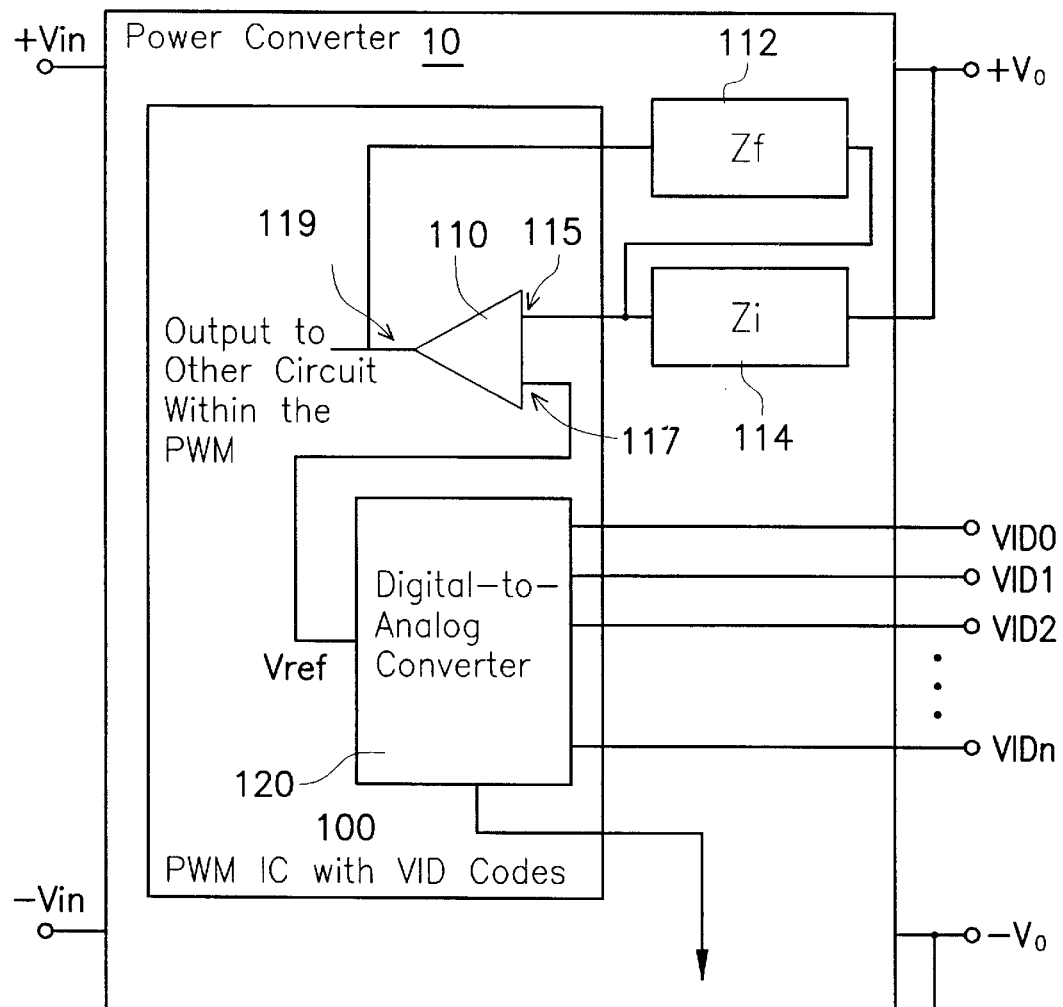
FIG. 1 is a diagram showing a conventional power converter and a portion of its internal electric circuit.

Reference will now be made in detail to the present preferred embodiments of the invention, examples of which are illustrated in the accompanying drawings. Wherever possible, the same reference numbers are used in the drawings and the description to refer to the same or like parts.

The concept of this invention is to use a current source and a voltage shift resistor to adjust the upper and lower limit of the output voltage without change the bit-map. In general, the voltage shift resistor can be achieved by, for example, a voltage shift impedance device. Since the bit-mapping relationship between the voltage identification codes and the output voltage remains unchanged, there is no need to redesign the voltage identification code for each output voltage range.

Figure 2:
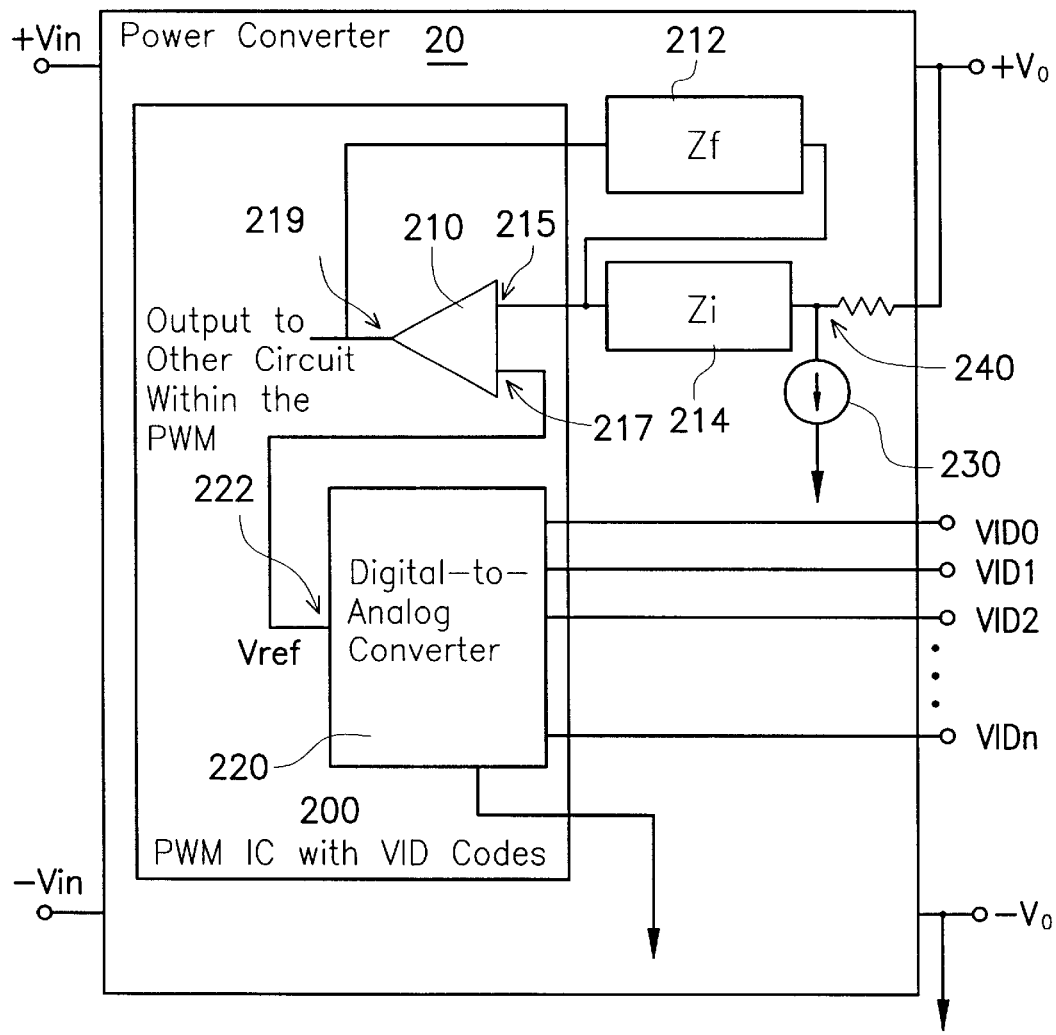
FIG. 2 is a diagram showing a power converter and a portion of its internal electric circuit according to a first preferred embodiment of this invention.

FIG. 2 is a diagram showing a power converter and a portion of its internal electric circuit according to a first preferred embodiment of this invention. As shown in FIG. 2, the power converter 20 includes a pulse width modulation integrated circuit (PWM IC) 200, a Zf 212, a Zi 214, a current source 230 and a voltage shift resistor 240. According to an input voltage identification code VID0~VIDn, the PWM IC 200 provides an adjusted voltage to the positive voltage output terminal +Vo of the power converter 20 via the Zi 214 and the voltage shift resistor 240. Here, Zi and Zf in the specification represent an impedance device, according to the actual design.

The PWM IC 200 includes a voltage comparator 210 and a digital-to-analog (D/A) converter 220. The D/A converter 220 receives the voltage identification code VID0~VIDn and outputs a reference voltage Vref at a reference voltage terminal 222 according to the voltage identification code. The reference voltage Vref is transmitted to the input terminal 217 of the voltage comparator 210 to serve as a base during voltage comparison. Output voltage at the compare output terminal 219 of the voltage comparator 210 is fed back to the other input terminal 215 of the voltage comparator 210 through the Zf 212. The feedback voltage is compared with the reference voltage Vref inside the voltage comparator 210.

After passing through the Zf 212, the output voltage from the compare output terminal 219 of the voltage comparator 210 is regulated by the circuit that includes the Zi 214, the current source 230 and the voltage shift resistor 240. The regulated voltage is transmitted to the positive output terminal +Vo of the power converter 20 for adjustment.

Since voltages at the two input terminals of the voltage comparator 210 is identical when the circuit is in a stable state, voltage at the positive output terminal +Vo in this embodiment is given by the formula:

$$Vo = Vref + I \times R,$$

where I is the current provided by the current source 230 and R is the resistance value of the voltage shift resistor 240. Hence, output voltage from the power converter 20 can be adjusted by regulating the quantity and direction of the current I or changing the resistance R.

Figure 3:
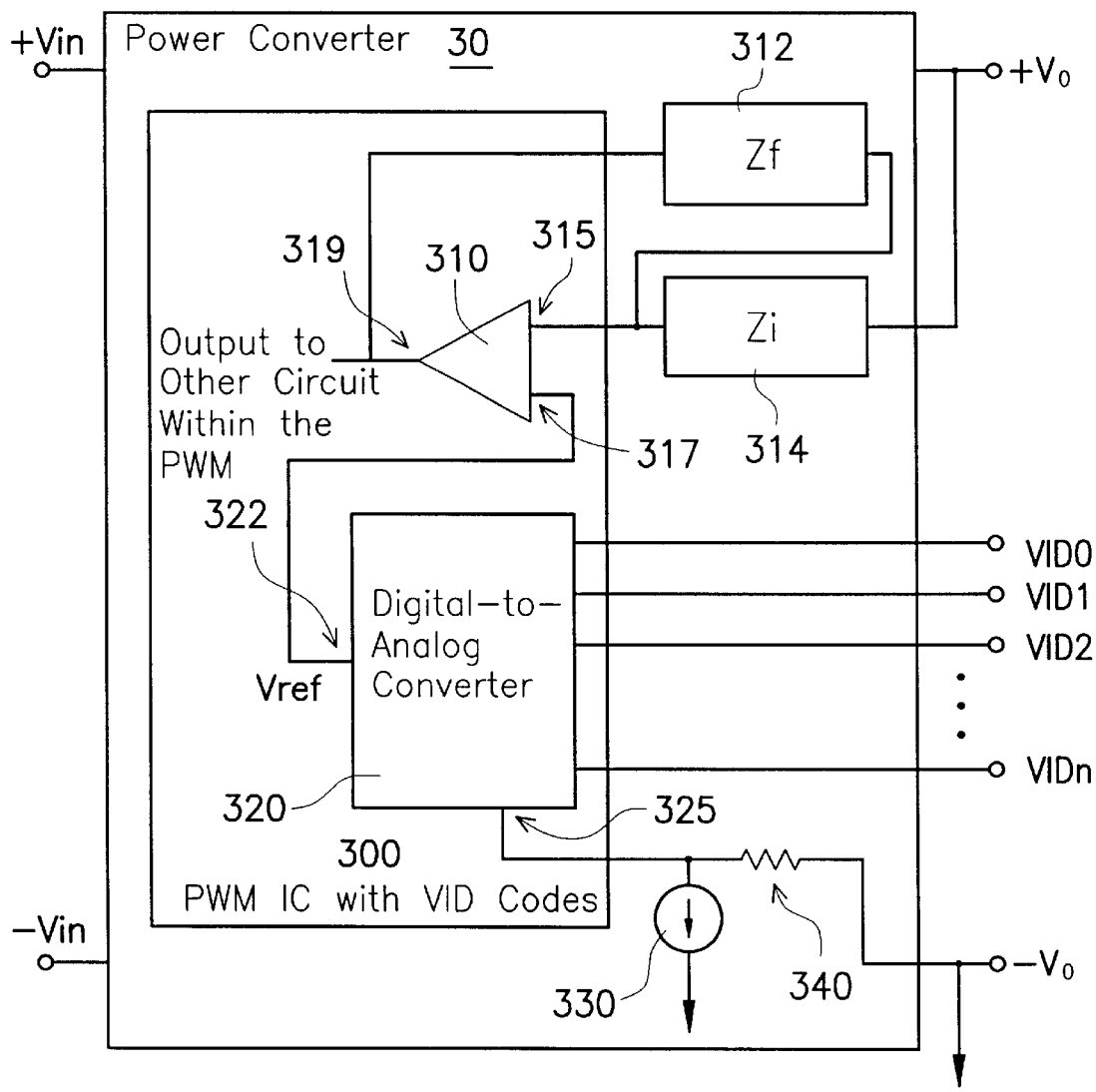
FIG. 3 is a diagram showing a power converter and a portion of its internal electric circuit according to a second preferred embodiment of this invention.

FIG. 3 is a diagram showing a power converter and a portion of its internal electric circuit according to a second preferred embodiment of this invention. As shown in FIG. 3, the power converter 30 includes a PWM IC 300, a Zf 312, a Zi 314, a current source 330 and a voltage shift resistor 340. According to an input voltage identification code VID0~VIDn, the PWM IC 300 provides an adjusted voltage to the positive voltage output terminal +Vo of the power converter 30 via the Zi 314.

The PWM IC 300 includes a voltage comparator 310 and a digital-to-analog (D/A) converter 320. The D/A converter 320 receives the voltage identification code VID~VIDn and outputs a reference voltage Vref at a reference voltage terminal 322 with respect to the voltage identification code. The reference voltage Vref is transmitted to the input terminal 317 of the voltage comparator 310 to serve as a base during voltage comparison. Output voltage at the compare output terminal 319 of the voltage comparator 310 is fed back to the other input terminal 315 of the voltage comparator 310 through the Zf 312. The feedback voltage is compared with the reference voltage Vref inside the voltage comparator 310.

The D/A converter 320 has a negative output terminal 325. The negative output terminal 325 is electrically connected to the negative output terminal −Vo of the power converter 30 via the voltage shift resistor 340. Ultimately, voltage at the negative output terminal −Vo can be adjusted by the current source 330 and the voltage shift resistor 340.

In the second embodiment, the negative output voltage −Vo is adjusted by the current source 330 and the voltage shift resistor 340 according to the following formula:

$$Vo=Vref-I\times R,$$

where I is the current provided by the current source 330 and R is the resistance value of the voltage shift resistor. Output voltage from the power converter 30 can be adjusted by regulating the quantity and direction of the current I or changing the resistance R.

Figure 4:
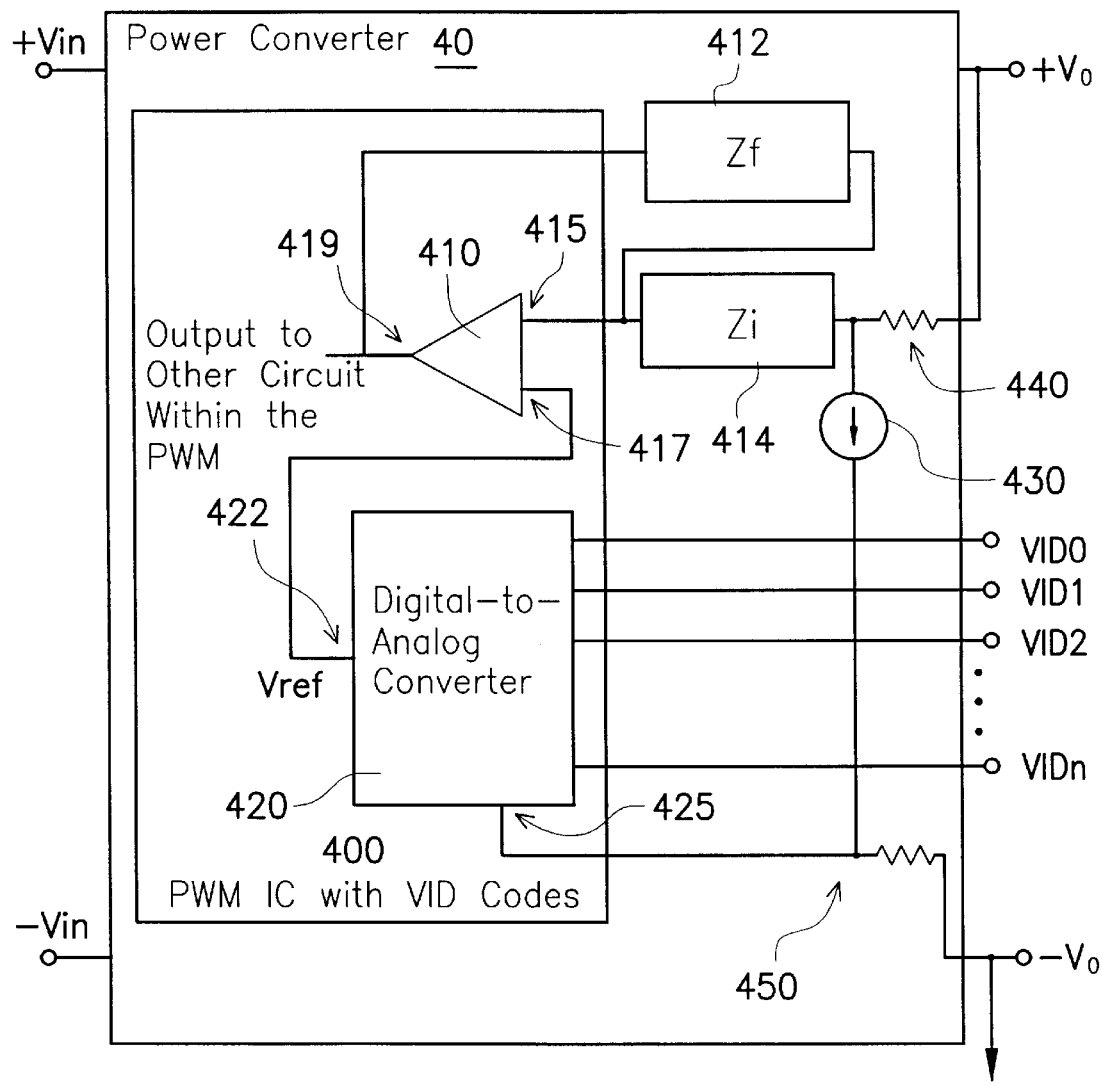
FIG. 4 is a diagram showing a power converter and a portion of its internal electric circuit according to a third preferred embodiment of this invention.

FIG. 4 is a diagram showing a power converter and a portion of its internal electric circuit according to a third preferred embodiment of this invention. As shown in FIG. 4, the power converter 40 includes a PWM IC 400, a Zf 412, a Zi 414, a current source 430, a first voltage shift resistor 440 and a second voltage shift resistor 450. According to an input voltage identification code VID0~VIDn, the PWM IC 400 provides an adjusted voltage to the positive voltage output terminal +Vo of the power converter 40 via the Zi 414 and the first voltage shift resistor 440.

The PWM IC 400 includes a voltage comparator 410 and a digital-to-analog (D/A) converter 420. The D/A converter 420 receives the input voltage identification code VID0~VIDn and outputs a reference voltage Vref at a reference voltage terminal 422 accordingly. The reference voltage Vref is transmitted to the input terminal 417 of the voltage comparator 410 to serve as a base during voltage comparison. Output voltage at the compare output terminal 419 of the voltage comparator 410 is fed back to the other input terminal 415 of the voltage comparator 410 through the Zf 412. The feedback voltage is compared with the reference voltage Vref inside the voltage comparator 410.

The D/A converter 420 has a negative output terminal 425. The negative output terminal 425 is electrically connected to the negative output terminal −Vo of the power converter 40 via the second voltage shift resistor 450. Ultimately, voltage at the negative output terminal −Vo can be adjusted by the current source 430 and the voltage shift resistor 450.

In the third embodiment of this invention, the two voltage shift resistors 440 and 450 use the same current source 430. Hence, the effect on the output voltage of the power converter 40 can be given by the following formula:

$$Vo=Vref+I\times(R1+R2),$$

where R1 and R2 are resistance of the two voltage shift resistors respectively.

In summary, a current source and a voltage shift resistor are used to increase the voltage range that can be reached by a power converter. Since there is no need to re-design the voltage identification code for each output voltage range, less time is needed in the research and development of PWM IC.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A power converter with adjustable output voltage, having a positive voltage output terminal and a negative voltage output terminal, comprising:
   a voltage comparator having a first input terminal, a second input terminal and a compare output terminal;
   a voltage shift impedance device;
   a Zf;
   a Zi; and
   a current source,
      wherein the compare output terminal of the voltage comparator is electrically coupled to a first terminal of the Zf, the first input terminal is electrically coupled to a second terminal of the Zf and a first terminal of the Zi, a second terminal of the Zi is electrically coupled to the current source and a first terminal of the voltage shift impedance device, a second terminal of the voltage shift impedance device is electrically coupled to the positive voltage output terminal, and the second input terminal is electrically connected for receiving a reference voltage.

2. The power converter of claim 1, wherein the reference voltage is provided by a digital-to-analog converter, and the digital-to-analog converter is a device that receives a voltage identification code and outputs the reference voltage accordingly.

3. The power converter of claim 1, wherein the voltage shift impedance device includes a voltage shift resistor.

4. An adjustable output voltage power converter having a positive voltage output terminal and a negative voltage output terminal, comprising:
   a voltage comparator having a first input terminal, a second input terminal and a compare output terminal;
   a digital-to-analog converter having a reference voltage output terminal and a negative output terminal, wherein the digital-to-analog converter receives a voltage identification code and outputs a reference voltage corresponding to the voltage identification code at the reference voltage output terminal of the digital-to-analog converter;
   a voltage shift impedance device; and
   a current source,
      wherein the compare output terminal is electrically coupled to a first terminal of a Zf, the first input terminal is electrically coupled to a second terminal of the Zf and a first terminal of the Zi, a second terminal of the Zi is electrically coupled to the positive voltage output terminal, and the second input terminal is electrically coupled to a terminal that provides a reference voltage;
      wherein the negative output terminal is electrically coupled to the current source and a first terminal of the voltage shift impedance device, and a second terminal of the voltage shift impedance device is electrically coupled to the negative voltage output terminal.

5. The power converter of claim 4, wherein the voltage shift impedance device includes a voltage shift resistor.

6. An adjustable output voltage power converter having a positive voltage output terminal and a negative voltage output terminal, comprising:
   a voltage comparator having a first input terminal, a second input terminal and a compare output terminal;
   digital-to-analog converter having a reference voltage output terminal and a negative output terminal, wherein the digital-to-analog converter receives a voltage identification code and outputs a reference voltage corresponding to the voltage identification code at the reference voltage output terminal of the digital-to-analog converter;

a first voltage shift impedance device;

a second voltage shift impedance device; and a current source having a first terminal and a second terminal;

wherein the compare output terminal is electrically coupled to a first terminal of a Zf, the first input terminal is electrically coupled to a second terminal of the Zf and a first terminal of the Zi, a second terminal of the Zi is electrically coupled to the first terminal of the current source and the first terminal of the first voltage shift impedance device, a second terminal of the first voltage shift impedance device is electrically coupled to the positive voltage output terminal, and the second input terminal is electrically coupled for receiving a reference voltage, wherein the negative output terminal is electrically coupled to the second terminal of the current source and a first terminal of the second voltage shift impedance device, and a second terminal of the second voltage shift impedance device is electrically coupled to the negative voltage output terminal.

7. The power converter of claim 6, wherein the first voltage shift impedance device includes a voltage shift resistor.

8. The power converter of claim 6, wherein the second voltage shift impedance device includes a voltage shift resistor.

9. An adjustable output voltage power converter having a positive voltage output terminal, a negative voltage output terminal and a pulse width modulation integrated circuit, wherein the pulse width modulation integrated circuit outputs an adjusted voltage to the positive voltage output terminal via a Zi according to a voltage identification code, comprising:

a voltage shift impedance device, wherein a first terminal of the voltage shift impedance device is electrically coupled to a first terminal of the Zi and a second terminal is electrically coupled to the positive voltage output terminal; and a current source, wherein a first terminal of the current source is electrically coupled to a circuit path between the voltage shift impedance device and the Zi.

10. The power converter of claim 9, wherein the voltage shift impedance device includes a voltage shift resistor.

11. An adjustable output voltage power converter having a positive voltage output terminal, a negative voltage output terminal and a pulse width modulation integrated circuit, wherein the pulse width modulation integrated circuit has a negative output terminal and outputs an adjusted voltage to the positive voltage output terminal via a Zi according to a voltage identification code, comprising:

a voltage shift impedance device, wherein a first terminal of the voltage shift impedance device is electrically coupled to a first terminal of the Zi and a second terminal is electrically coupled to the negative voltage output terminal; and a current source, wherein a first terminal of the current source is electrically coupled to the circuit path between the voltage shift impedance device and the negative output terminal.

12. The power converter of claim 11, wherein the voltage shift impedance device includes a voltage shift resistor.

13. An adjustable output voltage power converter having a positive voltage output terminal, a negative voltage output terminal and a pulse width modulation integrated circuit, wherein the pulse width modulation integrated circuit has a negative output terminal and outputs an adjusted voltage to the positive voltage output terminal via a Zi according to a voltage identification code, comprising:

a first voltage shift impedance device, wherein a first terminal of the first voltage shift impedance device is electrically coupled to a first terminal of the Zi and a second terminal is electrically coupled to the positive voltage output terminal;

a second voltage shift impedance device, wherein a first terminal of the second voltage shift impedance device is electrically coupled to a first terminal of the negative output terminal and a second terminal is electrically coupled to the negative voltage output terminal; and a current source, wherein a first terminal of the current source is electrically coupled to a circuit path between the Zi and the first voltage shift impedance device and a second terminal of the current source is electrically coupled to a circuit path between the negative output terminal and the second voltage shift impedance device.

14. The power converter of claim 13, wherein the first voltage shift impedance device includes a voltage shift resistor.

15. The power converter of claim 13, wherein the second voltage shift impedance device includes a voltage shift resistor.

* * * * *